C. GLASER & G. J. MULLER.
PROCESS OF REFINING SALT.
APPLICATION FILED NOV. 17, 1909.
957,417.
Patented May 10, 1910.
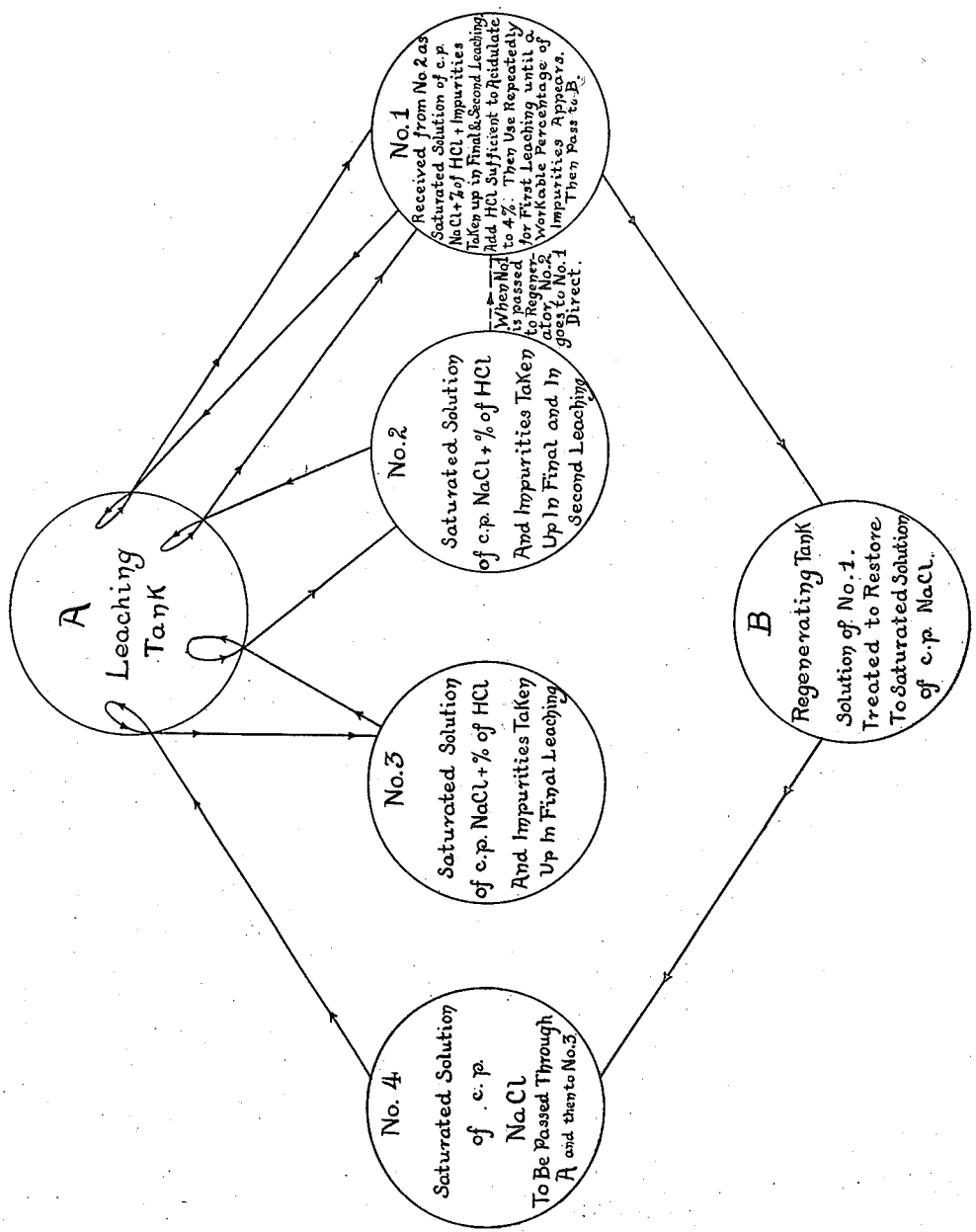

UNITED STATES PATENT OFFICE.

CHARLES GLASER AND GEORGE J. MULLER, OF BALTIMORE, MARYLAND.

PROCESS OF REFINING SALT.

957,417.  Specification of Letters Patent.  Patented May 10, 1910.

Original application filed May 17, 1909, Serial No. 496,525. Divided and this application filed November 17, 1909. Serial No. 528,566.

*To all whom it may concern:*

Be it known that we, CHARLES GLASER and GEORGE J. MULLER, citizens of the United States, and residents of Baltimore, in the State of Maryland, have invented a new and useful Process of Refining Salt, of which the following is a specification, reference being had to the accompanying drawing, which is a schematic representation of one illustrative method of putting the invention into effect.

This invention relates to the separation from salt (sodium chlorid) of the impurities which occur with it in nature and particularly those impurities with which it is generally sold in crude state, prior to refining.

This application is a division of our application filed May 17, 1909, Serial No. 496,525.

The object of the invention is to remove the impurities from the salt either absolutely as when the salt is desired for chemical or pathological purposes, where even a fractional percentage of impurity is undesirable; or to reduce the proportion of impurities to such an extent or leave them only of such character as will make them wholly unobjectionable for ordinary commercial purposes; and to attain these results in a simple and efficient manner and at a moderate cost.

The present invention consists primarily in purifying salt in solid state by leaching it with a solvent which consists of a saturated solution of pure salt containing acid of such character and restricted quantity as to dissolve certain impurities insoluble in water and thus make them amenable to further treatment and removal; the pure salt solution being obtained from any suitable source and by any suitable process, but preferably by the process described in the application of which this case is a division.

A further feature consists in treating the filtrate obtained from the leaching process referred to and purifying it, preferably by the process forming the subject matter of the application of which this is a division, and thereafter reacidulating the resultant purified brine and again using it for the leaching process already referred to.

In carrying out the invention, salt in solid form is placed in a suitable vat or container. A suitable quantity of saturated solution of substantially pure salt is then treated by the addition of from one to four percent. of hydrochloric acid. With the resultant solution, the salt to be purified is leached. The acid is not sufficient to precipitate any of the salt in the solution, but is sufficient to render soluble the impurities occurring in the salt and make them amenable to the solvent of pure brine, which, after thorough mixing with the salt, may be drawn off in the usual way. The leaching solvent may be reused several times before becoming sufficiently saturated with impurities as to render it ineffective. Or a series of containers of salt may be successively treated by successive charges of solvent and the solvent after being used for such number of times or passed through such number of salt receptacles as may seem advisable, may be subjected to the purifying process by chemical reaction such as described in the application of which the present case is a division, and thus made ready for reacidulation and reuse.

To explain the invention more fully, an illustrative process will be described.

1000 kilograms of commercial table salt are placed in a suitable leaching tank, provided with a filtering bottom. To 1000 kg. of purified brine 10 to 40 kg. of muriatic acid are added in a suitable storage tank placed above the leaching tank. After thorough mixing, this acidulated brine is allowed to run into the leaching tank completely covering the salt therein. It is allowed to stand in contact with the salt for 2 to 6 hours and is then drawn off and pumped back into the storage tank. 1000 kg. of pure brine solution is now added in portions of 250 kg. at a time, to the salt in the leaching tank, the earlier portions carrying with them the remaining impurities and acid, while the last portion will pass through as pure brine. The salt is now removed from the leaching tank and dried in a well known manner. The yield is nearly 1000 kg.

Another example is illustrated in the accompanying drawing, according to which the salt to be treated is contained in receptacle A, while the leaching brines are divided into say four portions, which are placed in separate receptacles and which may be numbered 1, 2, 3 and 4. The brine contained in receptacle number 1 is now acidulated until it contains about four per cent. of acid. The salt in vat A is now leached by the acidulated brine from receptacle number 1 after which said brine is returned to said receptacle number 1. The batch of salt in A is then leached by the brine from receptacle number 2 which, having now taken up some of the residual acid and the dissolved impurities left in the salt from the first leaching brine, is not returned to receptacle number 2 but to receptacle number 1. The salt in A is then leached by brine from receptacle number 3 and as this likewise takes up some residual acid and dissolved impurities, though a much smaller proportion, remaining in the salt, said leaching solution number 3 on leaving the salt, is passed to receptacle number 2. Finally, the brine from receptacle number 4, which is a neutral solution of pure salt, is passed through the salt in vat A and takes up any remaining acid and dissolved impurities. While this last leach passes from vat A as substantially pure brine, it is nevertheless slightly contaminated, and is therefore passed to receptacle number 3 to leave room for fresh supply in receptacle number 4 where the brine must always be pure, to secure the best results. Each batch of salt is similarly treated to the contents of the successive brine receptacles, each portion of brine being advanced toward the first receptacle as it takes up acid and impurities dissolved out of the salt contained in leaching tank A, each portion entering its particular receptacle but once until it comes to the first receptacle where it is used repeatedly until it shows an accumulation of workable impurities when it may be drawn off to receptacle B and regenerated. Whenever receptacle number 1 is emptied for regeneration of its contents, the brine from receptacle number 2 is removed to receptacle number 1 and sufficient acid added to it in addition to that with which it has been impregnated while being used as a leaching solution to bring it up to four per cent. In practice the old acid brine which has been transferred from receptacle number 1 to receptacle B is heated to fifty or sixty degrees centigrade (50 or 60° C) treated with barium chlorid to precipitate all the sulfuric radical and neutralized preferably either by an alkaline solution or by finely ground earthy carbonates such as dolomite, which permits only the calcium and magnesium impurities to remain; the brine is then treated to a solution of sodium carbonate and sodium hydroxid to precipitate all the calcium and magnesium as calcium and magnesium carbonate and hydroxid. The precipitates are now permitted to settle, the brine drawn off to receptacle four where it is neutralized with hydrochloric acid and used as a fresh supply of leach.

Having thus described the invention, what we claim as new therein and desire to secure by Letters Patent, is:—

1. The process of purifying salt which consists in leaching salt with its impurity by an acidulated saturated solution of pure salt, thereby dissolving the impurity from the salt to be purified.

2. The process of purifying salt which consists in leaching salt with its impurity by an acidulated saturated solution of pure salt, thereby dissolving the impurity from the salt to be purified, and then washing clean with a saturated solution of pure salt.

3. The process of purifying salt containing a plurality of impurities which consists in leaching the impure salt by an acidulated saturated solution of pure salt thereby dissolving out the impurities from the salt to be purified and then washing clean with a saturated solution of pure salt.

4. The process of purifying salt containing a plurality of impurities which consists in leaching the impure salt by an acidulated saturated solution of pure salt thereby dissolving out the impurities from the salt to be purified and then washing clean with a saturated solution of pure salt, then adding barium chlorid to the acidulated leaching solution to precipitate the sulfuric radical.

5. The process of purifying salt which consists in leaching the impure salt by an acidulated saturated solution of pure salt to dissolve out the impurities to be removed, washing clean with a saturated solution of pure salt, then adding barium chlorid to the acidulated leaching solution to precipitate the sulfuric radical, and thereafter neutralizing the acidulated solution.

6. The process of purifying salt which consists in leaching the impure salt by an acidulated saturated solution of pure salt to dissolve out the impurities to be removed, washing clean with a saturated solution of pure salt, then adding barium chlorid to the acidulated leaching solution to precipitate the sulfuric radical and thereafter neutralizing the acidulated solution and simultaneously precipitating impurities of the acidulated solution.

7. The process of purifying salt, which consists in leaching the impure salt by an acidulated saturated solution of pure salt, to dissolve out the impurities to be removed, washing clean with a saturated solution of pure salt, then adding barium chlorid to the acidulated leaching solution, to precipitate the sulfuric radical, thereafter neutralizing the acidulated solution and simultaneously precipitating the impurities of the solution, excepting elements of salt which those impurities contain.

8. The process of purifying salt which consists in leaching the impure salt, with an acidulated saturated solution of pure salt to dissolve out the impurities, washing clean with a saturated solution of pure salt, then adding barium chlorid to the acidulated leaching solution to precipitate the sulfuric radical and form more salt, then neutralizing the acidulated solution and simultaneously precipitating therefrom the contained impurities excepting those having an element of salt in their composition, and thereafter adding a reagent composed of elements, one of which combines with the salt producing element of the impurities to produce still more salt, while the remainder combine with the remaining elements of the impurities to form a precipitate.

9. The process of purifying salt in continuous operation which consists in leaching impure salt with an acidulated saturated solution of pure salt brine to dissolve out the impurities from the salt to be purified; washing clean with a saturated solution of pure salt, then adding barium chlorid to the acidulated leaching solution to precipitate the sulfuric radical and form more salt, then neutralizing the acidulated solution thus produced and precipitating elements of impurity other than those containing an element of salt; then treating the residual solutions with reagents to produce still more salt and precipitates containing elements foreign to pure salt, and finally taking the purified brine and reacidulating it for use as a new solvent.

10. The process of separating from sodium chlorid impurities in the form of oxids of iron and other heavier metals, sulfates of alkali and earth metals and chlorids of earth metals, which consists in adding to the impure salt a solution of purified salt containing hydrochloric acid, digesting, separating liquid from solid, washing with pure brine, and recovering from the solution by addition of barium chlorid, followed by sodium carbonate and sodium hydroxid the impurities in the form of barium sulfate, ferric hydroxid, carbonate of calcium and magnesium hydroxid and combining the sodium and chlorin elements of the reagents and the impurities to form sodium chlorid in addition to that sought to be purified.

The foregoing specification signed at Baltimore this eighth day of October, 1909.

CHARLES GLASER.
GEORGE J. MULLER.

In presence of—
STANSBURY M. WILSON,
RUDOLF GLASER.